(12) United States Patent
Ueno (10) Patent No.: US 11,061,633 B2
(45) Date of Patent: Jul. 13, 2021

(54) INFORMATION PROCESSING DEVICE AND METHOD FOR SELECTING SPECIFIC SETTING ITEMS RELATED TO JOB AND UPDATE TOTAL NUMERAL VALUES TO ATTAIN REDUCED PRINTING COST

(71) Applicant: KYOCERA Document Solutions Inc., Osaka (JP)

(72) Inventor: Toshiaki Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/767,765

(22) PCT Filed: Nov. 22, 2018

(86) PCT No.: PCT/JP2018/043176
§ 371 (c)(1),
(2) Date: May 28, 2020

(87) PCT Pub. No.: WO2019/107270
PCT Pub. Date: Jun. 6, 2019

(65) Prior Publication Data
US 2020/0356326 A1 Nov. 12, 2020

(30) Foreign Application Priority Data
Nov. 29, 2017 (JP) .............................. JP2017-229093

(51) Int. Cl.
*H04N 1/00* (2006.01)
*G06F 3/12* (2006.01)
*H04N 1/32* (2006.01)

(52) U.S. Cl.
CPC .......... *G06F 3/1254* (2013.01); *G06F 3/1204* (2013.01); *G06F 3/1255* (2013.01); *H04N 1/00816* (2013.01); *H04N 1/32427* (2013.01)

(58) Field of Classification Search
None
See application file for complete search history.

(56) References Cited

U.S. PATENT DOCUMENTS 8,643,869 B2 * 2/2014 Takamiya ............. G06F 3/1239
358/1.15
2007/0229873 A1 10/2007 Kato
(Continued)

FOREIGN PATENT DOCUMENTS

JP 2000235466 A 8/2000
JP 2007272764 A 10/2007
(Continued)

*Primary Examiner* — Haris Sabah
(74) *Attorney, Agent, or Firm* — Alleman Hall Creasman & Tuttle LLP (57) ABSTRACT

An information processing apparatus (20) includes: an operation/display portion (22); a reception processing portion (211) that receives a selection operation for selecting an objective related to setting a print job; and a display processing portion (214) that, when the reception processing portion (211) has received the selection operation, displays, among a plurality of setting items G22 to G29 related to the print job, a plurality of specific setting items G22 to G28 that have preliminarily been associated with the objective selected by the selection operation, in such a manner as to be distinguishable from the other setting item G29.

5 Claims, 9 Drawing Sheets

(56) References Cited

U.S. PATENT DOCUMENTS

| | | | | |
|---|---|---|---|---|
| 2008/0201248 A1* | 8/2008 | Wellons | ............... | H04M 3/51 |
| | | | | 705/35 |
| 2010/0053673 A1* | 3/2010 | Oba | .................. | G03G 21/02 |
| | | | | 358/1.15 |
| 2010/0118321 A1 | 5/2010 | Ebuchi et al. | | |
| 2011/0134442 A1* | 6/2011 | Mori | .................. | G06F 3/1285 |
| | | | | 358/1.2 |
| 2011/0280435 A1* | 11/2011 | Chiba | ............... | H04N 1/00411 |
| | | | | 382/100 |
| 2017/0070642 A1* | 3/2017 | Miyamoto | ......... | H04N 1/00204 |

FOREIGN PATENT DOCUMENTS

| | | | |
|---|---|---|---|
| JP | 2010117915 A | 5/2010 | |
| JP | 2011244147 A | 12/2011 | |

\* cited by examiner

| OBJECTIVE | SPECIFIC SETTING ITEM | SETTING CONTENT | NUMERAL VALUE |
|---|---|---|---|
| COST REDUCTION | DOUBLE-SIDE /SINGLE-SIDE PRINTING | DOUBLE-SIDE | 20.0 |
| | | SINGLE-SIDE | 10.0 |
| | COLOR/MONOCHROME | COLOR | 2.5 |
| | | MONOCHROME | 10.0 |
| | PAGE AGGREGATION | 1in1 | 10.0 |
| | | 2in1 | 20.0 |
| | | 4in1 | 40.0 |
| | PRINT TIME ZONE | DAYTIME | 8.0 |
| | | NIGHTTIME | 10.0 |
| | TONER SAVING LEVEL | NORMAL PRINTING | 8.0 |
| | | PALE PRINTING | 9.0 |
| | | PALER | 10.0 |
| | PAPER SHEET TYPE | NORMAL PAPER | 4.0 |
| | | ROUGH PAPER | 5.0 |
| | | COLOR PAPER | 2.5 |
| | RESOLUTION | 600dpi | 5.0 |
| | | 1200dpi | 2.5 |

FIG.5

| OBJECTIVE | SPECIFIC SETTING ITEM | SETTING CONTENT | NUMERAL VALUE |
|---|---|---|---|
| EASY TO SEE | DOUBLE-SIDE /SINGLE-SIDE PRINTING | DOUBLE-SIDE | 5.0 |
| | | SINGLE-SIDE | 10.0 |
| | COLOR/MONOCHROME | COLOR | 40.0 |
| | | MONOCHROME | 4.0 |
| | PAGE AGGREGATION | 1in1 | 20.0 |
| | | 2in1 | 10.0 |
| | | 4in1 | 5.0 |
| | TONER SAVING LEVEL | NORMAL PRINTING | 10.0 |
| | | PALE PRINTING | 9.0 |
| | | PALER | 8.0 |
| | PAPER SHEET TYPE | NORMAL PAPER | 8.0 |
| | | ROUGH PAPER | 5.0 |
| | | COLOR PAPER | 10.0 |
| | RESOLUTION | 600dpi | 5.0 |
| | | 1200dpi | 10.0 |

| OBJECTIVE | SPECIFIC SETTING ITEM | SETTING CONTENT |
|---|---|---|
| COST REDUCTION | DOUBLE-SIDE /SINGLE-SIDE PRINTING | DOUBLE-SIDE |
| | COLOR/MONOCHROME | MONOCHROME |
| | PAGE AGGREGATION | 4in1 |
| | PRINT TIME ZONE | NIGHTTIME |
| | TONER SAVING LEVEL | PALER |
| | PAPER SHEET TYPE | ROUGH PAPER |
| | RESOLUTION | 600dpi |

INFORMATION PROCESSING DEVICE AND METHOD FOR SELECTING SPECIFIC SETTING ITEMS RELATED TO JOB AND UPDATE TOTAL NUMERAL VALUES TO ATTAIN REDUCED PRINTING COST

TECHNICAL FIELD

The present invention relates to an information processing apparatus and a job setting method capable of setting the setting items related to a job.

BACKGROUND ART

There is known an image forming apparatus such as a printer that is configured to form an image based on image data (see, for example, PTL 1). In addition, there is known an information processing apparatus such as a personal computer that is connected to the image forming apparatus via a communication network such as a LAN. For example, in the information processing apparatus, content of the setting items related to a print job executed in the image forming apparatus is set in accordance with user operations.

CITATION LIST

Patent Literature

[PTL 1] Japanese Patent Application Publication No. H4-70769

SUMMARY OF THE INVENTION

Problems to be Solved by the Invention

Meanwhile, a user of the information processing apparatus may set contents of the setting items to attain an objective such as "cost reduction". Here, in a case where a wide variety of setting items are displayed on a display portion of the information processing apparatus, it is burdensome for the user to search for setting items related to a desired objective.

The present invention has been made in view of such conventional circumstances, and it is an object of the present invention to provide an information processing apparatus and a job setting method capable of reducing the burden of the user in searching for setting items for a desired objective.

Solution to the Problems

An information processing apparatus according to an aspect of the present invention includes a reception processing portion and a display processing portion. The reception processing portion receives a selection operation for selecting an objective related to setting a job. The display processing portion, when the reception processing portion has received the selection operation, displays, among a plurality of setting items related to the job, one or more specific setting items that have preliminarily been associated with the objective selected by the selection operation, in such a manner as to be distinguishable from other setting items.

A job setting method according to another aspect of the present invention includes: receiving a selection operation for selecting an objective related to setting a job; and when the selection operation has been received, displaying, among a plurality of setting items related to the job, one or more specific setting items that have preliminarily been associated with the objective selected by the selection operation, in such a manner as to be distinguishable from other setting items.

Advantageous Effects of the Invention

According to the present invention, it is possible to provide an information processing apparatus and a job setting method capable of reducing the burden of the user in searching for setting items for a desired objective.

DESCRIPTION OF EMBODIMENTS

The following describes an embodiment of the present invention with reference to the accompanying drawings. It should be noted that the following embodiment is an example of a specific embodiment of the present invention and should not limit the technical scope of the present invention.

[Image Processing System 100]

Figure 1:
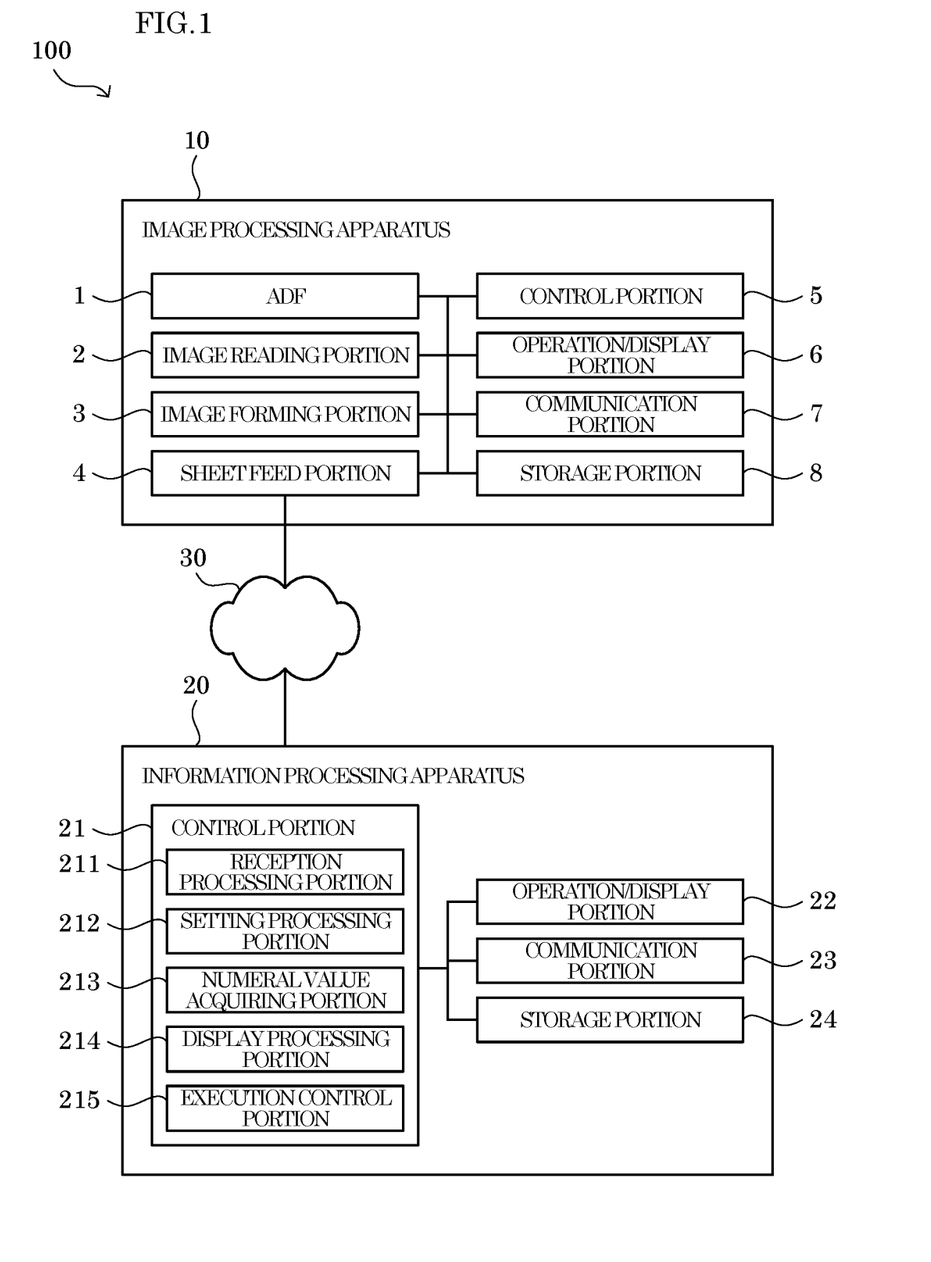
FIG. 1 is a block diagram showing a configuration of an image processing system according to an embodiment of the present invention.

As shown in FIG. 1, an image processing system 100 according to an embodiment of the present invention includes an image processing apparatus 10 and an information processing apparatus 20. In the image processing system 100, the image processing apparatus 10 and the information processing apparatus 20 are communicably connected with each other via a communication network 30. For example, the communication network 30 is the Internet or a LAN (Local Area Network).

[Image Processing Apparatus 10]

The image processing apparatus 10 is a multifunction peripheral having a plurality of functions such as a scan function for reading image data from a document sheet, a print function for forming an image based on image data, a facsimile function, and a copy function. It is noted that the image processing apparatus 10 may be a scanner, a printer device, a facsimile device, a copier, or a personal computer.

Figure 2:
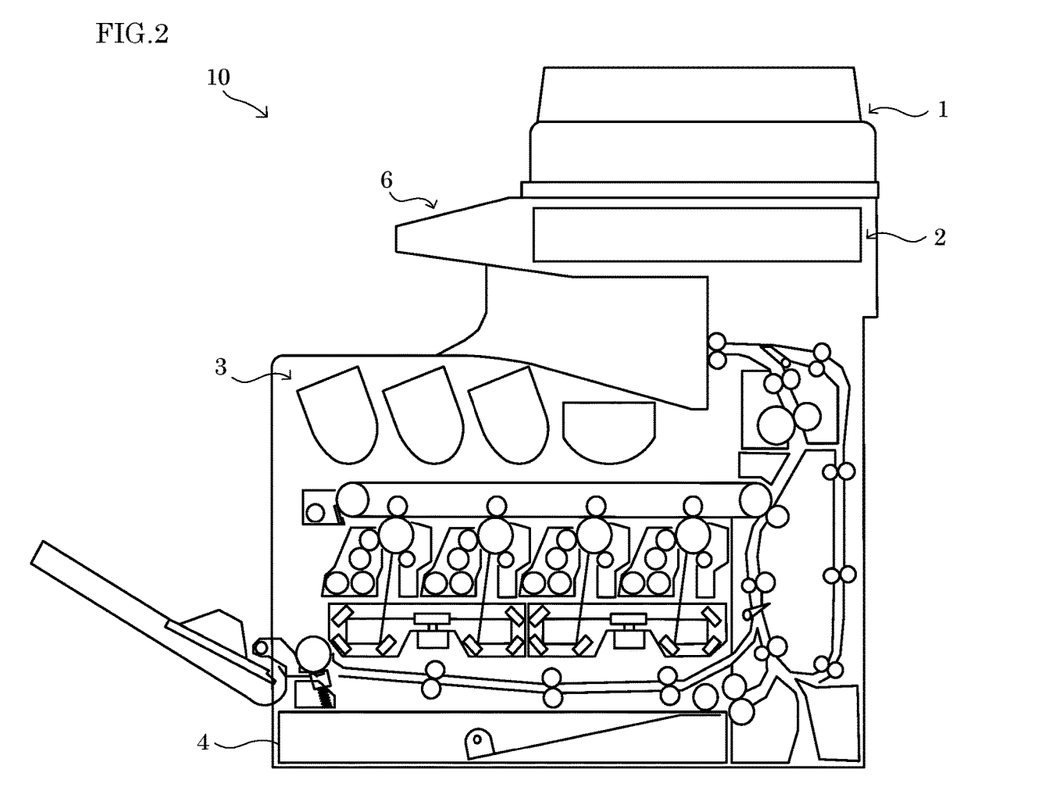
FIG. 2 is a diagram showing a configuration of an image processing apparatus included in the image processing system according to the embodiment of the present invention.

As shown in FIG. 1 and FIG. 2, the image processing apparatus 10 includes an ADF (Automatic Document Feeder) 1, an image reading portion 2, an image forming portion 3, a sheet feed portion 4, a control portion 5, an operation/display portion 6, a communication portion 7, and a storage portion 8. It is noted that FIG. 2 is a schematic cross-sectional diagram showing a configuration of the image processing apparatus 10.

The ADF 1 includes a document sheet setting portion, a plurality of conveyance rollers, a document sheet pressing, and a sheet discharge portion, and conveys a document sheet so that it is read by the image reading portion 2.

The image reading portion 2 includes a document sheet table, a light source, a plurality of mirrors, an optical lens, and a CCD, and is configured to read image data from a document sheet.

The image forming portion 3 is configured to form a color or monochrome image by an electrophotographic method based on image data read by the image reading portion 2. In addition, the image forming portion 3 is configured to form an image based on image data input from the information processing apparatus 20. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. It is noted that the image forming portion 3 may form an image by another image forming method such as an inkjet method.

The sheet feed portion 4 supplies a sheet to the image forming portion 3. Specifically, the sheet feed portion 4 includes a sheet feed cassette and a plurality of conveyance rollers. In the image processing apparatus 10, a color or monochrome image is formed on a sheet supplied from the sheet feed portion 4, and the sheet with the image formed thereon is discharged to the sheet discharge tray.

The control portion 5 includes a control equipment such as a CPU, a ROM, a RAM, and an EEPROM that are not shown. The CPU is a processor that executes various calculation processes. The ROM is a nonvolatile storage device in which various information such as control programs for causing the CPU to execute various processes are preliminarily stored. The RAM is a volatile storage device, and the EEPROM is a nonvolatile storage device. The RAM and the EEPROM are used as a temporary storage memory (working area) for the various processes executed by the CPU. In the control portion 5, the CPU executes the various control programs preliminarily stored in the ROM. This allows the image processing apparatus 10 to be controlled comprehensively by the control portion 5. It is noted that the control portion 5 may be an electronic circuit such as an integrated circuit (ASIC), and may be a control portion provided independently of a main control portion that comprehensively controls the image processing apparatus 10.

The operation/display portion 6 includes a display portion and an operation portion, wherein the display portion is, for example, a liquid crystal display and displays various types of information in response to control instructions from the control portion 5, and the operation portion is, for example, operation keys or a touch panel for inputting various types of information to the control portion 5 in response to user operations.

The communication portion 7 is a communication interface that is configured to execute a wired or wireless data communication with the information processing apparatus 20 via the communication network 30.

The storage portion 8 is a nonvolatile storage device. The storage portion 8 is, for example, a storage device such as a flash memory, an SSD (Solid State Drive) or an HDD (Hard Disk Drive).

[Information Processing Apparatus 20]

The information processing apparatus 20 is a personal computer that is configured to cause the image processing apparatus 10 to execute a print job. It is noted that the information processing apparatus 20 may be, for example, a notebook computer, a smartphone, a tablet terminal, or a PDA.

As shown in FIG. 1, the information processing apparatus 20 includes a control portion 21, an operation/display portion 22, a communication portion 23, and a storage portion 24.

The control portion 21 includes control equipment such as a CPU, a ROM, and a RAM that are not shown. The CPU is a processor that executes various calculation processes. The ROM is a nonvolatile storage device in which various information such as control programs for causing the CPU to execute various processes are stored in advance. The RAM is a volatile storage device that is used as a temporary storage memory (working area) for the various processes executed by the CPU. In the control portion 21, the CPU executes the various control programs preliminarily stored in the ROM. This allows the information processing apparatus 20 to be controlled comprehensively by the control portion 21.

The operation/display portion 22 includes a display portion and an operation portion, wherein the display portion is, for example, a liquid crystal display and displays various types of information in response to control instructions from the control portion 21, and the operation portion is composed of, for example, a keyboard and a mouse through which various types of information are input to the control portion 21 in response to user operations.

The communication portion 23 is a communication interface that is configured to execute a wired or wireless data communication with the image processing apparatus 10 via the communication network 30.

The storage portion 24 is a storage device such as an SSD (Solid State Drive) or an HDD (Hard Disk Drive).

In the information processing apparatus 20, an item display screen (see FIG. 7) is displayed in response to a user operation, wherein the item display screen is used to set setting items related to a print job. On the item display screen, a user of the information processing apparatus 20 can set any desired setting items and instruct to execute a print job.

Meanwhile, a user of the information processing apparatus 20 may set contents of setting items related to a print job to attain an objective such as "cost reduction". Here, in a case where a wide variety of setting items are displayed on the operation/display portion 22 of the information processing apparatus 20, it is burdensome for the user to search for setting items related to a desired objective.

On the other hand, in the image processing system 100 according to the embodiment of the present invention, as described in the following, it is possible to reduce the burden of the user in searching for setting items related to a desired objective.

Specifically, a job setting program for causing the CPU of the control portion 21 to execute a job setting process (see the flowchart of FIG. 10) that is described below is preliminarily stored in the storage portion 24 of the information processing apparatus 20. It is noted that the job setting program may be recorded on a computer-readable recording medium such as a CD, a DVD, or a flash memory, and may be installed from the recording medium to the storage portion 24.

As shown in FIG. 1, the control portion 21 includes a reception processing portion 211, a setting processing portion 212, a numeral value acquiring portion 213, a display processing portion 214, and an execution control portion 215. Specifically, the control portion 21 executes the job setting program stored in the storage portion 24 by using the CPU. This allows the control portion 21 to function as the reception processing portion 211, the setting processing portion 212, the numeral value acquiring portion 213, the display processing portion 214, and the execution control portion 215.

The reception processing portion 211 receives a selection operation for selecting an objective related to setting a print job. Here, the print job is an example of a job of the present invention.

For example, in response to a user operation, the reception processing portion 211 displays, on the operation/display portion 22, an objective selection screen which is used to perform the selection operation. Subsequently, the reception processing portion 211 waits for the selection operation to be performed on the objective selection screen.

Figure 3:
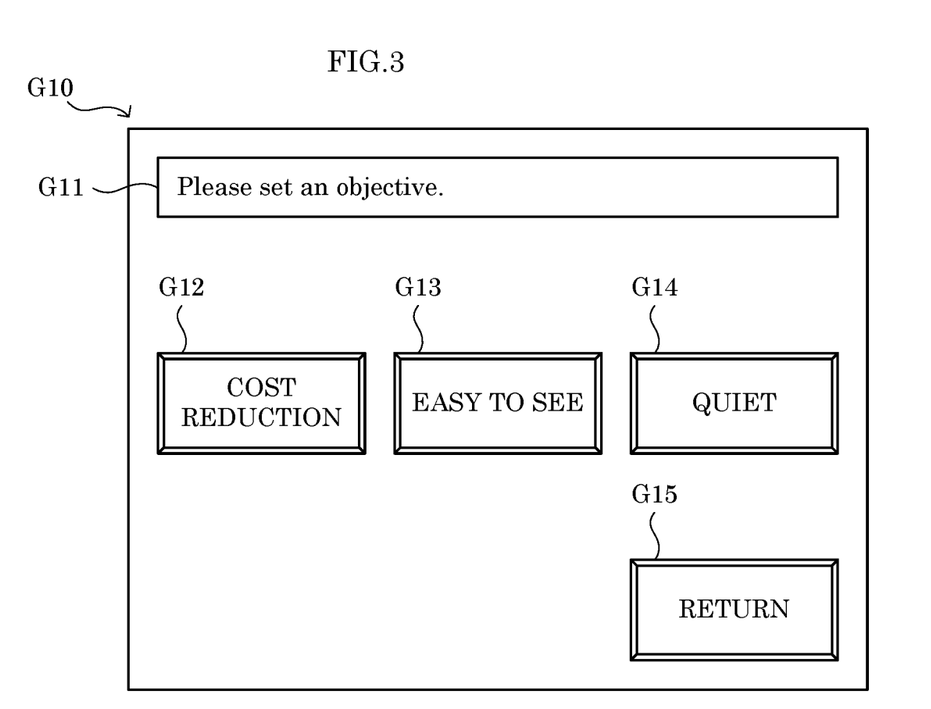
FIG. 3 is a diagram showing an example of an objective selection screen displayed in the image processing system according to the embodiment of the present invention.

FIG. 3 shows an objective selection screen G10 that is an example of the objective selection screen displayed on the operation/display portion 22 by the reception processing portion 211. As shown in FIG. 3, the objective selection screen G10 includes a message display field G11 and operation icons G12 to G15. A message to the user is displayed in the message display field G11. An objective "cost reduction" is displayed on the operation icon G12. An objective "easy to see" is displayed on the operation icon G13. An objective "quiet" is displayed on the operation icon G14. The selection operation is an operation of any one of the operation icons G12 to G14. An operation icon G15 is used to change the objective selection screen G10 to the immediately previous screen.

Here, each of the objectives is associated with one or more specific setting items among a plurality of setting items related to the print job. For example, in the information processing apparatus 20, correspondence data is preliminarily stored in the storage portion 24, wherein the correspondence data indicates association between the objectives and the specific setting items. It is noted that the correspondence data may be generated and changed in accordance with user operations performed on the operation/display portion 22.

Figure 4:
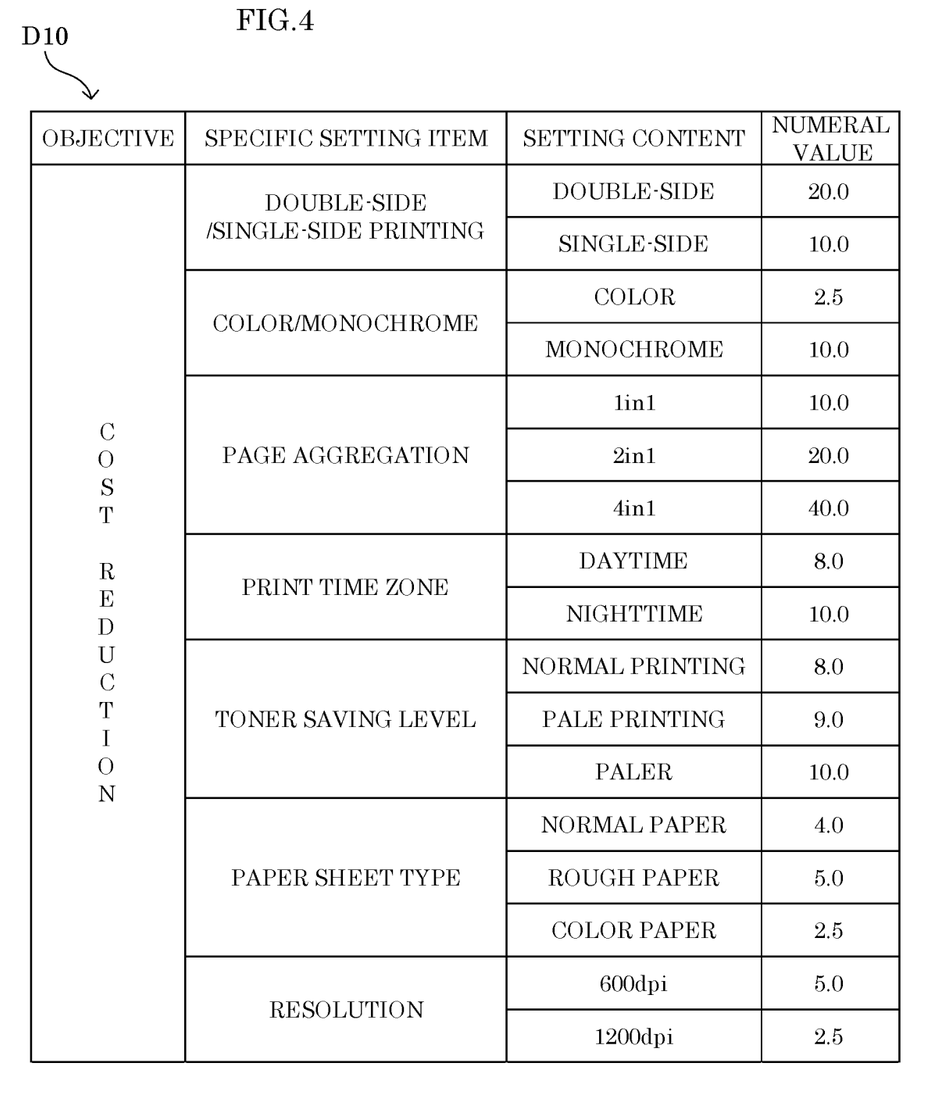
FIG. 4 is a diagram showing an example of correspondence data used in the image processing system according to the embodiment of the present invention.

FIG. 4 shows correspondence data D10 that is an example of the correspondence data. As shown in FIG. 4, the correspondence data D10 includes a plurality of specific setting items associated with the objective "cost reduction". In addition, the correspondence data D10 includes: a plurality of setting contents that can be set in each of the specific setting items; and a plurality of numeral values respectively representing the setting contents. Here, each of the numeral values indicates conformation of the corresponding setting content of a specific setting item to the objective, wherein the higher the numeral value is, the higher the conformation to the objective is.

It is noted that setting contents "1in1", "2in1", and "4in1" of "page aggregation" shown in FIG. 4 respectively indicate printing images of one, two, and four pages on a surface of a sheet. In addition, setting contents "daytime" and "nighttime" of "print time zone" shown in FIG. 4 respectively indicate executing the print job immediately and executing the print job in a predetermined time zone. For example, the predetermined time zone is a low power rate time zone.

Figure 5:
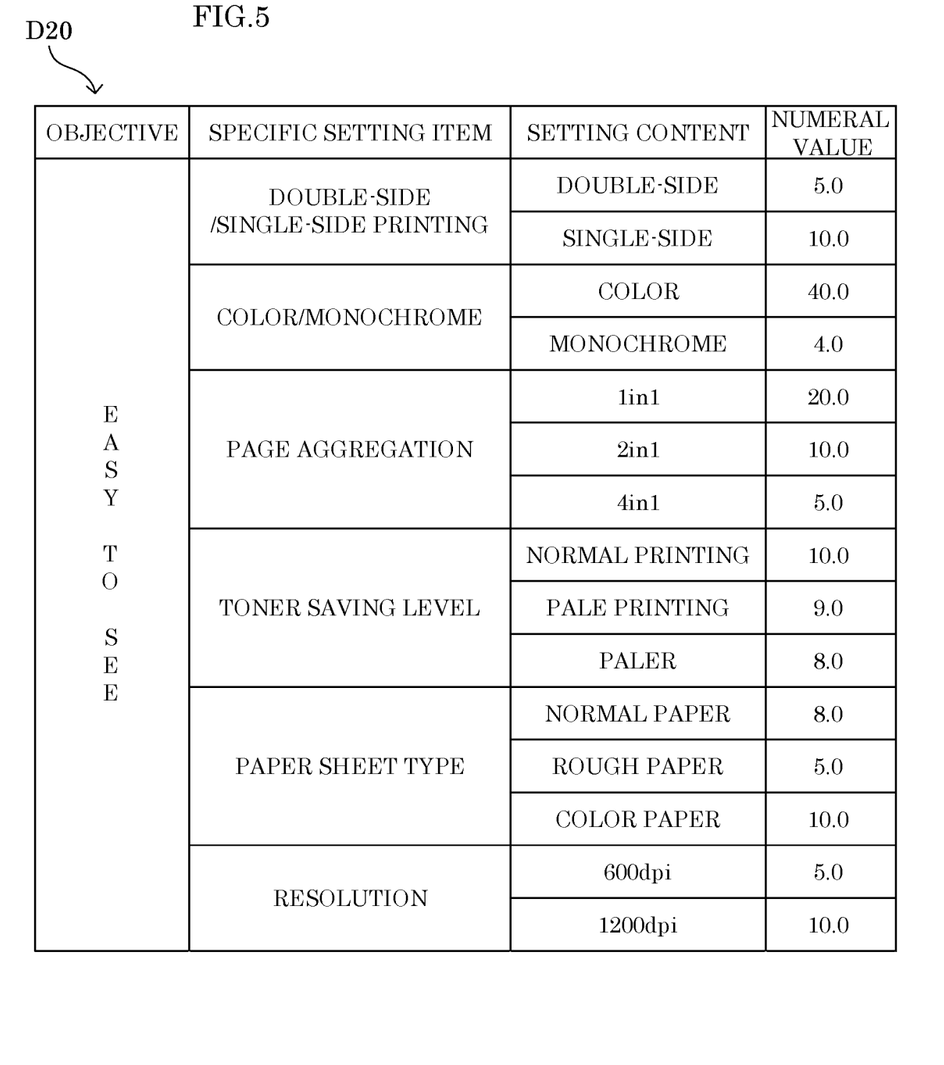
FIG. 5 is a diagram showing an example of the correspondence data used in the image processing system according to the embodiment of the present invention.

FIG. 5 shows correspondence data D20 that is another example of the correspondence data. As shown in FIG. 5, the correspondence data D20 includes a plurality of specific setting items associated with the objective "easy to see". In addition, the correspondence data D20 includes: a plurality of setting contents that can be set in each of the specific setting items; and a plurality of numeral values respectively representing the setting contents. As shown in FIG. 4 and FIG. 5, the correspondence data D20 does not include "print time zone" that is included in the correspondence data D10. This indicates that the specific setting item "print time zone" is not related to the objective "easy to see" of the correspondence data D20.

The setting processing portion 212 is configured to, when the reception processing portion 211 has received a selection operation, set contents of the specific setting items corresponding to the objective selected by the selection operation, based on setting data (an example of setting information of the present invention) that has preliminarily been associated with the objective selected by the selection operation.

In addition, the setting processing portion 212 sets contents of other setting items that are, among the plurality of setting items, setting items different from the specific setting items, based on initial values that are preliminarily determined for each of the other setting items.

For example, in the information processing apparatus 20, setting data for each of the objectives is preliminarily stored in the storage portion 24. For example, the setting data is one or more pieces of setting data that include setting contents of highest numeral values, among a plurality of setting contents of the specific setting items corresponding to the objective. It is noted that the setting data may be generated and changed in accordance with user operations performed on the operation/display portion 22.

Figure 6:
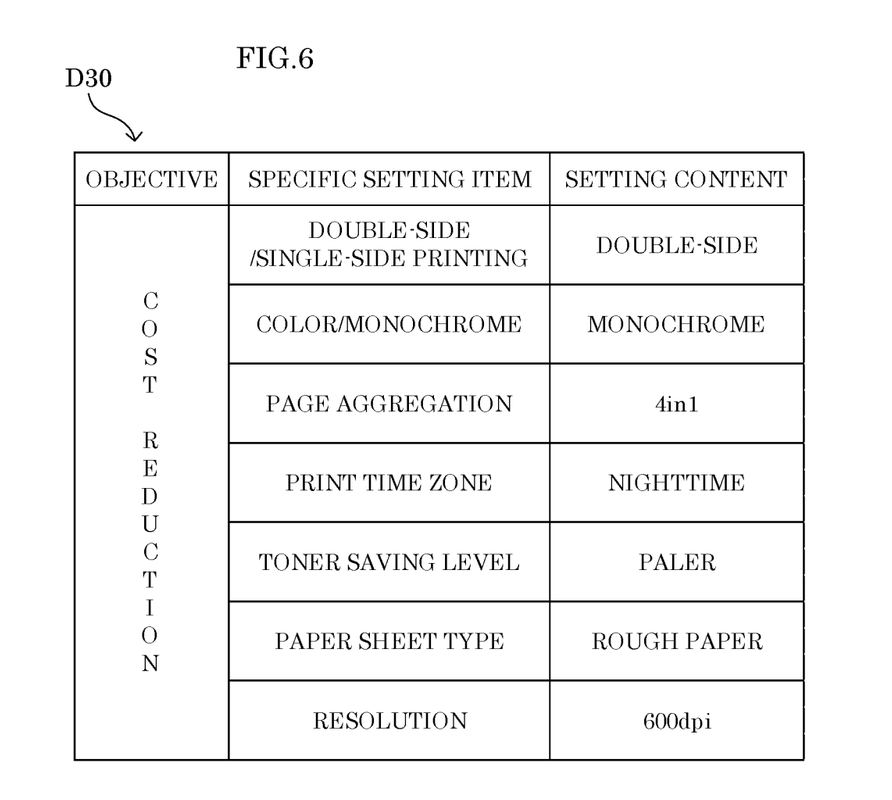
FIG. 6 is a diagram showing an example of setting data used in the image processing system according to the embodiment of the present invention.

FIG. 6 shows setting data D30 that is an example of the setting data. As shown in FIG. 6, the setting data includes setting contents of highest numeral values among a plurality of setting contents of a plurality of specific setting items corresponding to the objective "cost reduction".

For example, when the reception processing portion 211 has received a selection operation, the setting processing portion 212 acquires, from the storage portion 24, setting data corresponding to the objective selected by the selection operation. The setting processing portion 212 then stores setting contents of each of the specific setting items included in the setting data, into a predetermined first storage area in the RAM. In addition, the setting processing portion 212 stores initial values of each of the other setting items, into the first storage area in the RAM.

The numeral value acquiring portion 213 is configured to, when contents of the specific setting items corresponding to the objective selected by the selection operation are set, acquire numeral values that indicate the setting contents of the specific setting items that have preliminarily been associated with the objective.

For example, when the reception processing portion 211 has received a selection operation, the numeral value acquiring portion 213 acquires numeral values that indicate setting contents of specific setting items to be set by the setting processing portion 212, based on: correspondence data corresponding to the objective selected by the selection operation; and setting data corresponding to the objective. The numeral value acquiring portion 213 then associates the acquired numeral values with the specific setting items, and stores the numeral values associated with the specific setting items into a predetermined second storage area in the RAM.

In addition, when content of a specific setting item has been changed on an item display screen that is described below, the numeral value acquiring portion 213 acquires a numeral value that indicates setting content of the specific setting item after change based on the correspondence data that corresponds to the objective selected by the selection operation. The numeral value acquiring portion 213 then updates the storage content of the second storage area in the RAM, based on the acquired numeral value.

The display processing portion 214 is configured to, when the reception processing portion 211 has received a selection operation, display specific setting items corresponding to the objective selected by the selection operation, in such a manner as to be distinguishable from the other setting items.

For example, when the reception processing portion 211 has received a selection operation, the display processing portion 214 displays the item display screen that includes setting items related to the print job. Subsequently, the display processing portion 214 displays, on the item display screen, specific setting items corresponding to the objective selected by the selection operation, in such a manner as to be distinguishable from the other setting items.

For example, the display processing portion 214 changes either or both of the color and the density of each of the other setting items. It is noted that the display processing portion 214 may change either or both of the color and the density of each of the specific setting items. In addition, the display processing portion 214 may display the specific setting items with blinking.

In addition, the display processing portion 214 displays the specific setting items together with the numeral values that indicate the setting contents of the specific setting items corresponding to the objective selected by the selection operation. In addition, the display processing portion 214 updates displayed numeral values each time the content of the specific setting items is changed.

In addition, the display processing portion 214 displays a total value of the numeral values, and each time the content of the specific setting items is changed, updates the displayed total value.

For example, the display processing portion 214 displays: the numeral values that indicate the setting contents of the specific setting items corresponding to the objective selected by the selection operation; and the total value, based on the storage content of the second storage area in the RAM.

It is noted that the display processing portion 214 may not display the total value. In addition, the display processing portion 214 may display none of the numerical values and the total value.

Figure 7:
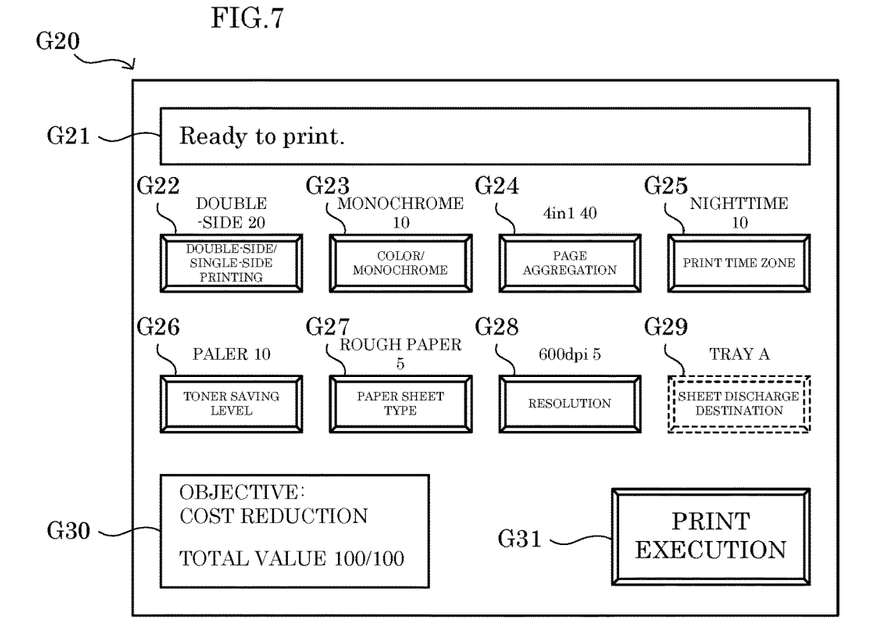
FIG. 7 is a diagram showing an example of an item display screen displayed in the image processing system according to the embodiment of the present invention.

FIG. 7 shows an item display screen G20 that is an example of the item display screen. The item display screen G20 is displayed on the operation/display portion 22 when the operation icon G12 is operated on the objective selection screen G10 shown in FIG. 3.

As shown in FIG. 7, the item display screen G20 includes a message display field G21, operation icons G22 to G29, an objective display field G30, and an operation icon G31. A message to the user is displayed in the message display field G21. The objective and the total value are displayed in the objective display field G30. The operation icon G31 is used to instruct an execution of a print job.

The operation icons G22 to G28 correspond to the specific setting items. Above each of the operation icons G22 to G28, a setting content of the operation icon and a numeral value indicating the setting content are displayed. The operation icon G29 corresponds to the other setting item. Above the operation icon G29, only a setting content of the operation icon is displayed. The operation icon G29 is displayed in a color and density that are different from those of the operation icons G22 to G28. In FIG. 7, a dotted line representing the operation icon G29 indicates that the display form of the operation icon G29 is different from that of the operation icons G22 to G28. The operation icons G22 to G29 are used to perform change operations to change contents of the setting items.

Figure 8:
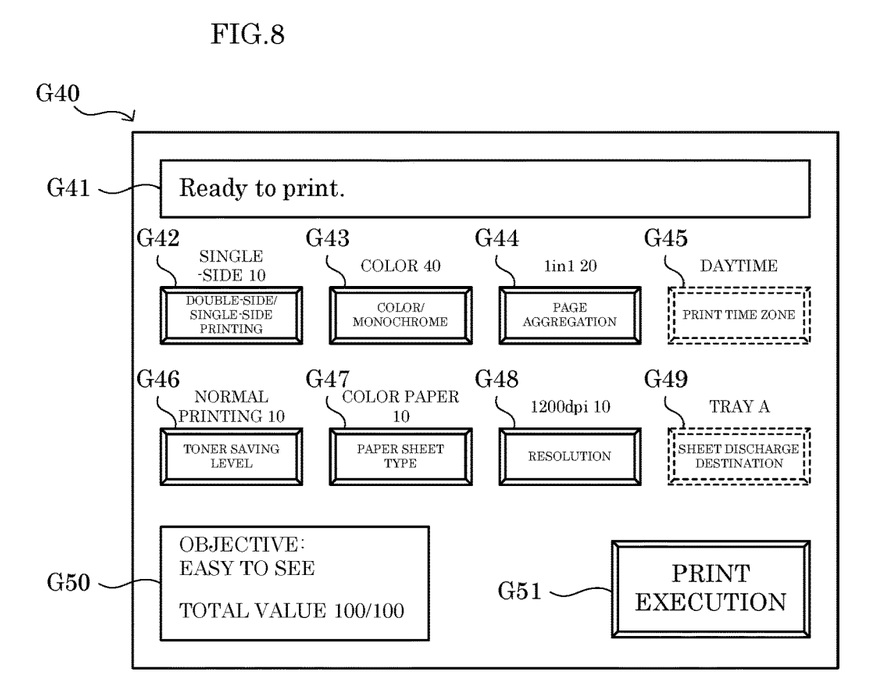
FIG. 8 is a diagram showing an example of the item display screen displayed in the image processing system according to the embodiment of the present invention.

FIG. 8 shows an item display screen G40 that is another example of the item display screen. The item display screen G40 is displayed on the operation/display portion 22 when the operation icon G13 is operated on the objective selection screen G10 shown in FIG. 3.

As shown in FIG. 8, the item display screen G40 includes a message display field G41, operation icons G42 to G49, an objective display field G50, and an operation icon G51. A message to the user is displayed in the message display field G41. The objective and the total value are displayed in the objective display field G50. The operation icon G51 is used to instruct an execution of a print job.

The operation icons G42 to G44 and G46 to G48 correspond to the specific setting items. Above each of the operation icons G42 to G44 and G46 to G48, a setting content of the operation icon and a numeral value indicating the setting content are displayed. The operation icons G45 and G49 correspond to the other setting items. Above each of the operation icons G45 and G49, only a setting content of the operation icon is displayed. The operation icons G45 and G49 are displayed in a color and density that are different from those of the operation icons G42 to G44 and G46 to G48. In FIG. 8, a dotted line representing the operation icons G45 and G49 indicates that the display form of the operation icons G45 and G49 is different from that of the operation icons G42 to G44 and G46 to G48. The operation icons G42 to G49 are used to perform change operations to change contents of the setting items.

Figure 9:
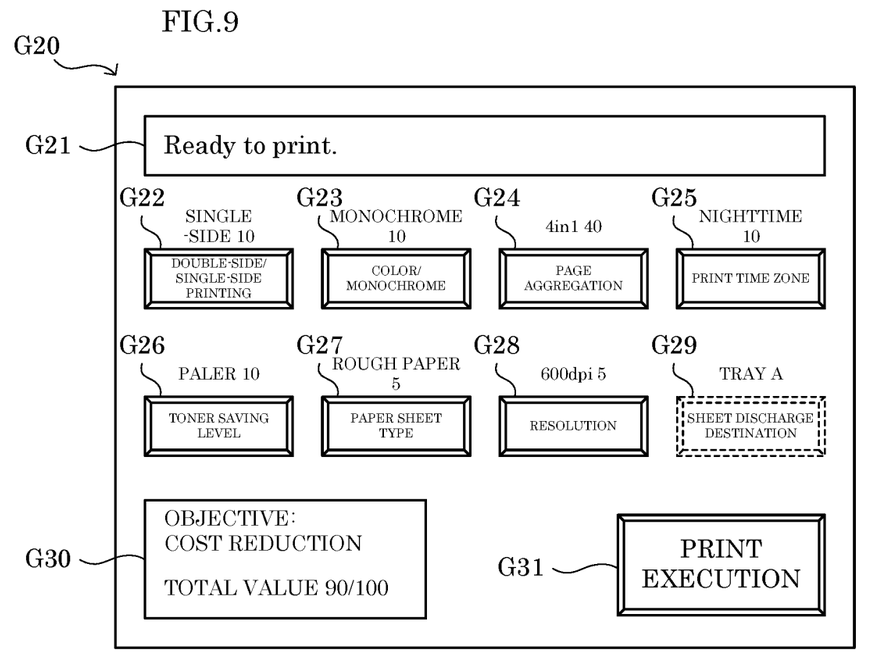
FIG. 9 is a diagram showing an example of the item display screen displayed in the image processing system according to the embodiment of the present invention.

FIG. 9 shows a state after a setting content of a specific setting item corresponding to the operation icon G22 has been changed on the item display screen G20 shown in FIG. 7. Specifically, in FIG. 9, the setting content of a specific setting item "double-side/single-side printing" has been changed from "double-side" displayed in FIG. 7 to "single-side". As a result, in the item display screen G20 shown in FIG. 9, the numeral value displayed above the operation icon G22 and the total value displayed in the objective display field G30 have been updated.

The execution control portion 215 is configured to prohibit the execution of the print job when the total value is lower than a threshold that has preliminarily been associated with the objective selected by the selection operation.

For example, in the information processing apparatus 20, thresholds corresponding to the objectives are preliminarily stored in the storage portion 24. It is noted that the thresholds may be set in accordance with user operations performed on the operation/display portion 22.

For example, when the total value is lower than a threshold that corresponds to the objective selected by the selection operation, the execution control portion 215 displays, on the operation/display portion 22, a message that the print job cannot be executed because the total value is lower than the threshold.

It is noted that the control portion 21 may not include one or more of the setting processing portion 212, the numeral value acquiring portion 213, and the execution control portion 215.

[Job Setting Process]

Figure 10:
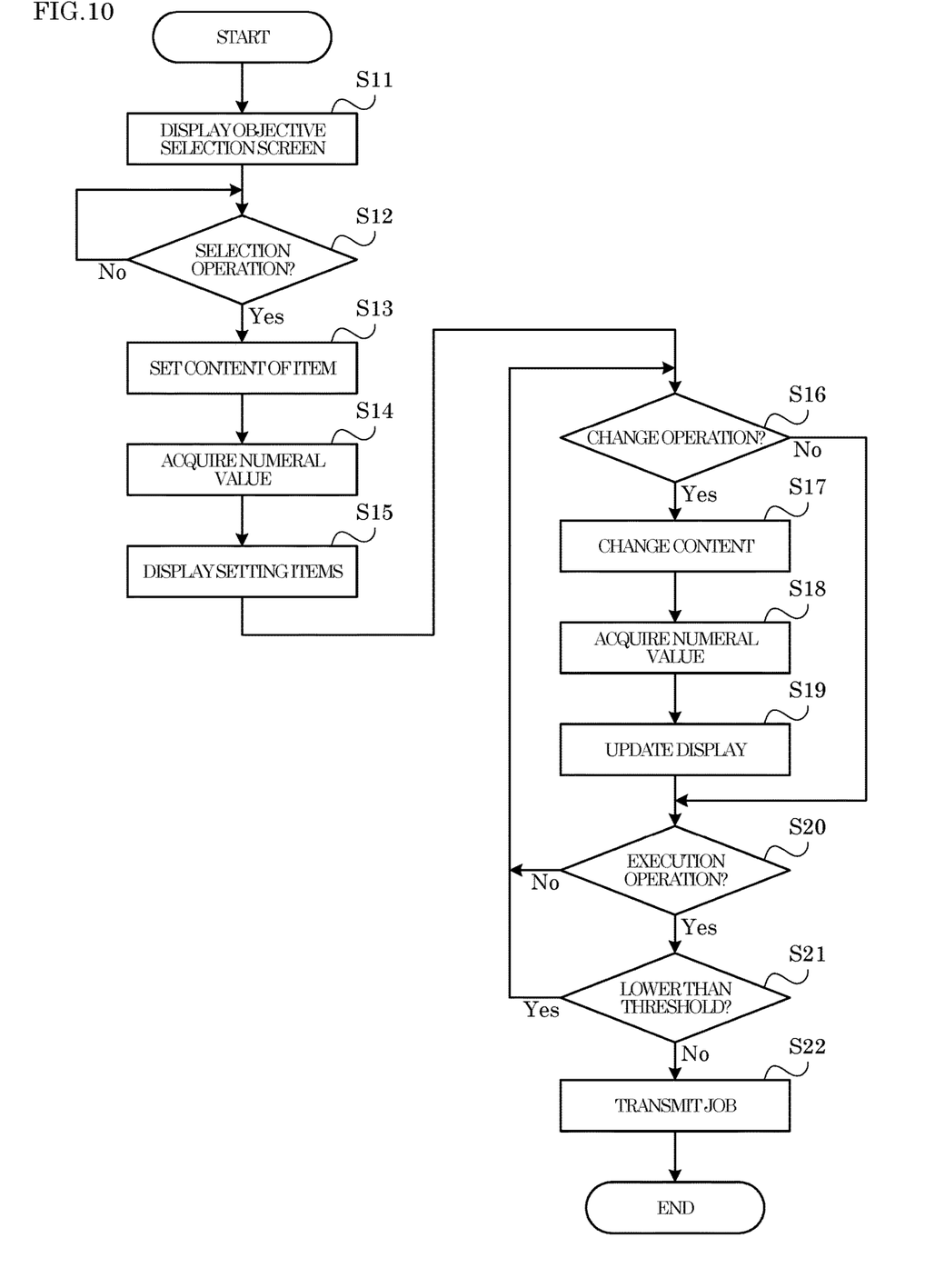
FIG. 10 is a flowchart showing an example of a job setting process executed in the image processing system according to the embodiment of the present invention.

In the following, with reference to FIG. 10, a description is given of an example of the procedure of the job setting process executed by the control portion 21 in the information processing apparatus 20. Here, steps S11, S12, . . . represent numbers assigned to the processing procedures (steps) executed by the control portion 21. It is noted that the job setting process is executed when a user operation instructing to display the objective selection screen is performed in a state where image data to be printed by the print job is specified.

<Step S11>

First, in step S11, the control portion 21 displays the objective selection screen on the operation/display portion 22. Here, the process of step S11 is executed by the reception processing portion 211 of the control portion 21.

For example, the control portion 21 displays the objective selection screen G10 shown in FIG. 3 on the operation/display portion 22.

<Step S12>

In step S12, the control portion 21 determines whether or not the selection operation has been received on the objective selection screen displayed in step S11.

For example, when any one of the operation icons G12 to G14 in the objective selection screen G10 has been operated, the control portion 21 determines that the selection operation has been received.

Here, upon determining that the selection operation has been received (Yes side at S12), the control portion 21 moves the process to step S13. In addition, upon determining that the selection operation has not been received (No side at S12), the control portion 21 waits at step S12 to receive the selection operation.

<Step S13>

In step S13, the control portion 21 sets contents of specific setting items corresponding to the objective selected by the selection operation received in step S12, based on the setting data corresponding to the objective selected by the selection operation. Here, the process of step S13 is executed by the setting processing portion 212 of the control portion 21.

For example, when the operation icon G12 is operated on the objective selection screen G10 shown in FIG. 3, the control portion 21 acquires, from the storage portion 24, the setting data D30 shown in FIG. 6. The control portion 21 then stores setting contents for each of the specific setting items included in the acquired setting data D30, into the first storage area in the RAM. This makes it possible to reduce the burden of the user in setting the setting contents of the specific setting items to conform to the objective selected by the selection operation. In addition, the control portion 21 stores initial values of the other setting items into the first storage area in the RAM.

<Step S14>

In step S14, the control portion 21 acquires the numeral values that indicate the setting contents of the specific setting items corresponding to the objective selected by the selection operation received in step S12. Here, the process of step S14 is executed by the numeral value acquiring portion 213 of the control portion 21.

For example, when the operation icon G12 is operated on the objective selection screen G10 shown in FIG. 3, the control portion 21 acquires the numeral values that indicate the setting contents of the specific setting items that were set in step S13, based on the correspondence data D10 shown in FIG. 4 and the setting data D30 shown in FIG. 6. The control portion 21 then associates the acquired numeral values with the specific setting items, and stores the numeral values associated with the specific setting items into the second storage area in the RAM.

<Step S15>

In step S15, the control portion 21 displays, on the operation/display portion 22, the item display screen in which the specific setting items corresponding to the objective selected by the selection operation received in step S12 are displayed in such a manner as to be distinguishable from the other setting items. Here, the process of step S15 is executed by the display processing portion 214 of the control portion 21.

For example, when the operation icon G12 is operated on the objective selection screen G10 shown in FIG. 3, the control portion 21 displays the item display screen G20 shown in FIG. 7. Here, the control portion 21 displays: numeral values that indicate the setting contents of the specific setting items; and the total value, based on the numeral values corresponding to the specific setting items stored in the second storage area in the RAM. This allows the user to recognize the proportion of the conformation of the setting content of each specific setting item to the objective, to the whole of the specific setting items. In addition, the display of the total value eliminates the need for the user to calculate the total value.

<Step S16>

In step S16, the control portion 21 determines whether or not the change operation for changing the content of any one of the setting items has been received on the item display screen displayed in step S15.

For example, in a case where the operation icon G22 is operated while the item display screen G20 shown in FIG. 7 is displayed, the control portion 21 displays an item setting screen that allows a change of setting contents of setting items corresponding to the operation icon G22. Subsequently, the control portion 21 determines that a change operation has been received when an operation specifying a setting content has been performed on the item setting screen.

Here, upon determining that a change operation has been received (Yes side at S16), the control portion 21 moves the process to step S17. In addition, upon determining that a change operation has not been received (No side at S16), the control portion 21 moves the process to step S20.

<Step S17>

In step S17, the control portion 21 changes the setting content of the setting item in accordance with the change operation received in step S16.

For example, the control portion 21 changes the storage content of the first storage area in the RAM in accordance with the change operation.

<Step S18>

In step S18, the control portion 21 acquires a numeral value that indicates the setting content of the specific setting item that was changed in step S17. Here, the process of step S18 is executed by the numeral value acquiring portion 213 of the control portion 21.

For example, in a case where the item display screen G20 shown in FIG. 7 is displayed, the control portion 21 acquires a numeral value that indicates the changed setting content of the specific setting item, based on the correspondence data D10 shown in FIG. 4. Subsequently, the control portion 21 updates the storage content of the second storage area in the RAM based on the acquired numeral value.

It is noted that in a case where the setting item whose content was changed in step S17 is one of the other setting items, the control portion 21 may omit the process of step S18.

<Step S19>

In step S19, the control portion 21 updates the display of the numeral values and the total value on the item display screen displayed in step S15. Here, the process of step S19 is executed by the display processing portion 214 of the control portion 21.

For example, the control portion 21 updates the display of the numeral values and the total value on the item display screen based on the storage content of the second storage area in the RAM. This allows the user to recognize, based on the numeral values and the total value, to what degree a change of the setting content of a specific setting item exerts an influence upon the whole of the specific setting items.

<Step S20>

In step S20, the control portion 21 determines whether or not an execution operation instructing to execute the print job has been received.

For example, when the operation icon G31 is operated while the item display screen G20 shown in FIG. 7 is displayed, the control portion 21 determines that the execution operation has been received.

Here, upon determining that the execution operation has been received (Yes side at S20), the control portion 21 moves the process to step S21. In addition, upon determining that the execution operation has not been received (No side at S20), the control portion 21 moves the process to step S16.

<Step S21>

In step S21, the control portion 21 determines whether or not the total value displayed on the item display screen when the execution operation is received in step S20, is lower than a threshold associated with the objective selected by the selection operation received in step S12.

Here, upon determining that the total value is lower than the threshold (Yes side at S21), the control portion 21 displays, on the operation/display portion 22, a message that the print job cannot be executed because the total value is lower than the threshold, and moves the process to step S16. This restricts the print job from being executed based on a setting content that does not conform to the objective. In addition, upon determining that the total value is not lower than the threshold (No side at S21), the control portion 21 moves the process to step S22.

<Step S22>

In step S22, the control portion 21 generates a print job based on display content of the item display screen at the time when the execution operation was received in step S20, and transmits the generated print job to the image processing apparatus 10. Here, the processes of steps S21 and S22 are executed by the execution control portion 215 of the control portion 21.

For example, the control portion 21 generates a print job including image data to be printed, based on the storage content of the first storage area in the RAM.

On the other hand, the image processing apparatus 10 executes the print job transmitted from the information processing apparatus 20 upon receiving the print job. Here, the image processing apparatus 10 executes the print job in accordance with the setting content of the setting items included in the print job.

It is noted that, in the job setting process, the processes of steps S13, S14, S18, and S21 may be omitted.

As described above, in the image processing system 100, when a selection operation is received, specific setting items corresponding to an objective selected by the selection operation are displayed in such a manner as to be distinguishable from the other setting items. With this configuration, it is possible to reduce the burden of the user in searching for setting items of a job related to a desired objective.

The job of the present invention is not limited to the print job. For example, the job of the present invention may be a transmission job, a copy job, a facsimile transmission job or the like executed in the image processing apparatus 10. Here, the transmission job is a job of transmitting image data read by the image reading portion 2 to the information processing apparatus 20. In this case, the control portion 5 of the image processing apparatus 10 may include the reception processing portion 211, the setting processing portion 212, the numeral value acquiring portion 213, the display processing portion 214, and the execution control portion 215. In addition, the job setting process may be executed by the image processing apparatus 10. Here, the image processing apparatus 10 including the control portion 5 that includes the reception processing portion 211, the setting processing portion 212, the numeral value acquiring portion 213, the display processing portion 214, and the execution control portion 215 is another example of the information processing apparatus of the present invention.

The invention claimed is:

1. An information processing apparatus comprising a processor and a storage device, wherein the processor is configured to function as:
    a reception processing portion configured to receive a selection operation for selecting an objective, wherein a degree of achievement of the objective changes according to a setting content of a job; and
    a display processing portion configured to, when the reception processing portion has received the selection operation, display, among a plurality of setting items related to the job, one or more specific setting items that change the degree of achievement of the objective selected by the selection operation, in such a manner as to be distinguishable from other setting items, wherein
    the storage device stores correspondence data that indicates association between contents of the specific setting items and numeral values that indicate levels of conformation to the objectives, and
    the display processing portion, based on the correspondence data stored in the storage device, displays the specific setting items together with the numeral values associated with the contents of the specific setting items, further displays a total value of the numeral values, and each time a content of the specific setting items is changed, updates the displayed numeral values and the displayed total value.

2. The information processing apparatus according to claim 1, wherein the processor is further configured to function as:
    a setting processing portion configured to, when the reception processing portion has received the selection operation, set contents of the specific setting items corresponding to the objective selected by the selection operation, based on setting information that has preliminarily been associated with the objective selected by the selection operation.

3. The information processing apparatus according to claim 1, wherein the processor is further configured to function as:

an execution control portion configured to prohibit execution of the job when the total value is lower than a threshold that has preliminarily been associated with the objective selected by the selection operation.

4. The information processing apparatus according to claim 1, comprising:
   either one or both of an image reading portion and an image forming portion, the image reading portion being configured to read image data from a document sheet, the image forming portion being configured to form an image based on the image data.

5. A job setting method executed in an information processing apparatus including a storage device, the job setting method comprising:
   receiving a selection operation for selecting an objective, wherein a degree of achievement of the objective changes according to a setting content of a job; and
   when the selection operation has been received, displaying, among a plurality of setting items related to the job, one or more specific setting items that change the degree of achievement of the objective selected by the selection operation, in such a manner as to be distinguishable from other setting items, wherein the storage device stores correspondence data that indicates association between contents of the specific setting items and numeral values that indicate levels of conformation to the objectives, and based on the correspondence data stored in the storage device, the specific setting items are displayed together with the numeral values associated with the contents of the specific setting items, a total value of the numeral values is further displayed, and each time a content of the specific setting items is changed, the displayed numeral values and the displayed total value are updated.

* * * * *